United States Patent [19]

Paris et al.

[11] 3,849,597

[45] Nov. 19, 1974

[54] SIMULATOR VISUALIZATION DEVICE

[75] Inventors: Philippe Y. J. Paris, Fontenay-aux-Roses; Pierre P. A. Bougon, Elancourt; Lucien Guimard, Montrouge, all of France

[73] Assignee: International Standard Electric Corporation, New York, N.Y.

[22] Filed: May 7, 1973

[21] Appl. No.: 358,055

[30] Foreign Application Priority Data

May 5, 1972 France .............................. 72.16098

[52] U.S. Cl. .............. 178/6.8, 35/10.2, 128/DIG. 1, 178/DIG. 35

[51] Int. Cl. ............................................ H04m 7/18

[58] Field of Search ................ 178/DIG. 35, DIG. 1; 35/10.2

[56] References Cited

UNITED STATES PATENTS

| | | | |
|---|---|---|---|
| 3,373,506 | 3/1968 | Davidoff | 35/12 |
| 3,604,848 | 9/1971 | Driskell | 178/6.8 |
| 3,784,740 | 1/1974 | Copland | 178/6.8 |

*Primary Examiner*—Howard W. Britton
*Assistant Examiner*—Edward L. Coles
*Attorney, Agent, or Firm*—William T. O'Neil

[57] ABSTRACT

A device for closed circuit television simulators used in vehicle operator training. The view as seen from the vehicle by a TV camera is modified by circuits operating on the camera video, sync., and blanking outputs to produce the type of presentation which would result (at night) from one or more modes of headlight illumination.

6 Claims, 9 Drawing Figures

SIMULATOR VISUALIZATION DEVICE

CROSS REFERENCE TO RELATED APPLICATION

This application is filed under the provisions of 35 USC 119 with claim for the benefit of the filing of an application covering the same invention filed May 5, 1972, Ser. No. 72 16098, in France.

BACKGROUND OF THE INVENTION

1. Field of the Invention

The invention relates generally to training simulators and more particularly, to devices for simulating vehicle visual night driving conditions through use of closed circuit television with special adaptations.

2. Description of the Prior Art

It is known to employ a television camera to scan a reduced scale terrestrial model in a closed circuit arrangement to provide a visual representation on a display device simulating the view from a moving vehicle. In such devices the camera angle is trainee controlled and the images are presented on the display to the trainee and perhaps to an instructor's (or observer's) monitor display.

It is known that vehicle headlights illuminate only a portion of the environment. Theoretically, the headlight beam is conical and illuminates only objects within a discrete cone of light. Practically, however, due to atmospheric conditions, light scattering, diffraction and secondary reflections, the illuminated area is not precisely delineated, there being a gradual transition from full light to substantial darkness.

One solution to the problem of reproducing realistically simulated visual night driving conditions would consist in illuminating the model, in an analog manner, by means of a reduced scale illumination device corresponding to vehicle head-lights. In view of the model size and light power necessary realization of this first solution is relatively impractical.

A conventional and simple solution consists in using a mask, for instance, made of a photographic negative having relative opacity and transmissibility distributed in accordance with the brightness distribution of the desired image; that is with the illumination area produced by the simulated vehicle headlights. However, that solution has a number of drawbacks; in particular, it is not easy to simulate successive uses of two different illumination modes, such as alternate use of full and low beam headlights. The manner in which the present invention provides an advantageous implementation for devices of the character described will be evident as this description proceeds.

SUMMARY OF THE INVENTION

There is proposed, according to the present invention, a device for reproducing visual night driving conditions in vehicle simulators provided with closed circuit television for reproducing views as seen from a vehicle. The scene viewed by the camera may be in model, film, or other simulated form. Signals from the camera are processed in a control channel before being applied to the TV receivers, so as to produce on each display, brightness distributions corresponding to various possible vehicle illumination modes.

According to a feature of the present invention, the device for reproducing visual night driving conditions comprises circuits for subtracting, from imagery signals delivered by the camera, correction signals resulting in reducing video signal amplitudes by variable proportions depending on the location within the field of view.

Other features of this invention will appear more clearly from the following description of embodiments, the said description being made in conjunction with the accompanying drawings.

DESCRIPTION OF THE PREFERRED EMBODIMENT

Figures 1, 3:
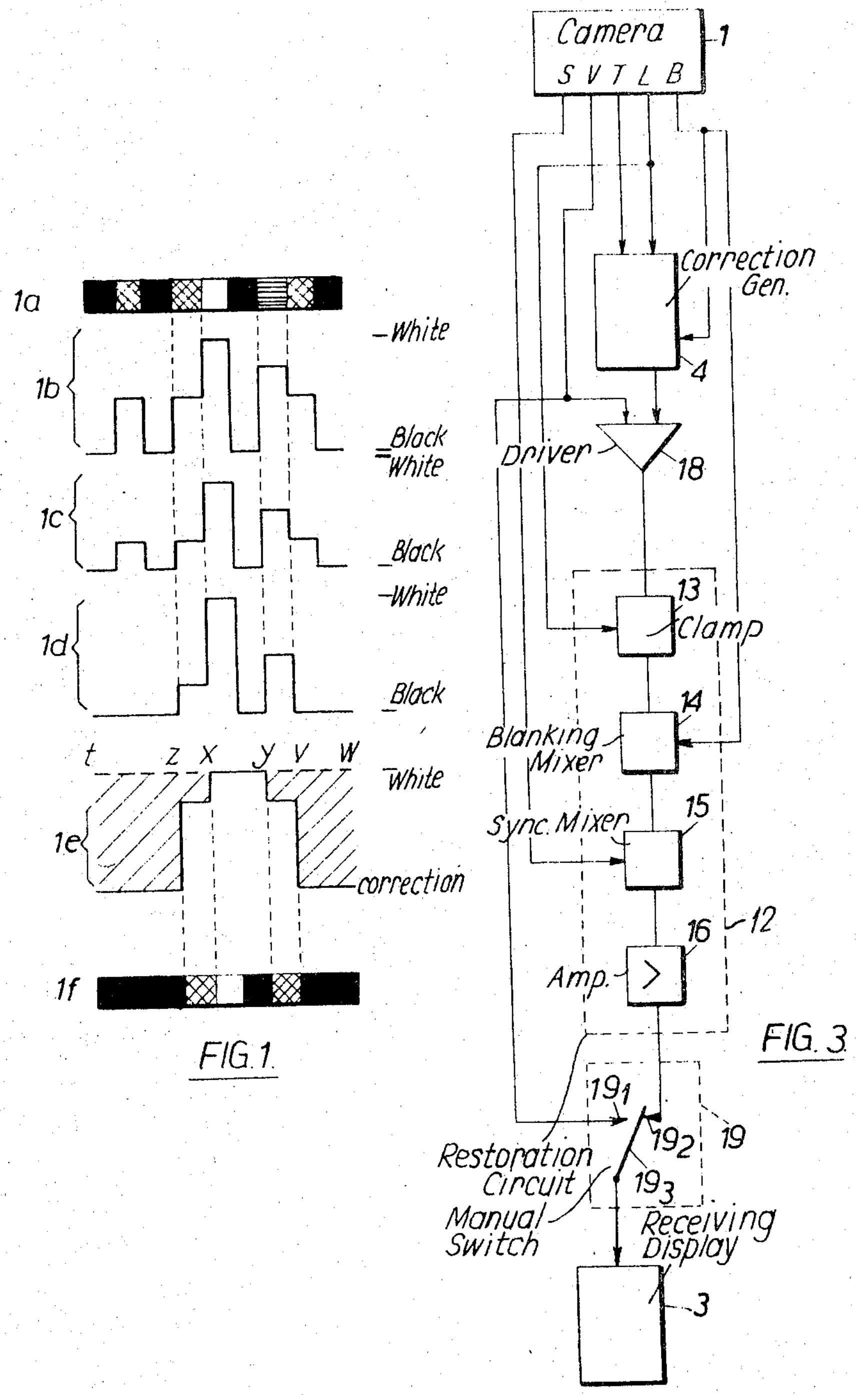
FIG. 1 shows a set of waveforms 1*a*-1*f* of the light intensity modifying signals.
FIG. 3 is a block diagram of an alternative embodiment for generating the FIG. 1 signals.

In a known manner, the image sensed by a television camera is scanned by successive lines, producing a series of signals. These signals are transmitted to the receiving displays. The representation 1*a* of FIG. 1 is assumed to correspond to a cross-section of the light intensity pattern received by a camera for a single line. Those intensities at the camera are converted into signals having amplitude variations which are symbolically represented by 1*b* for a typical illumination pattern. In that example, the amplitude variations correspond to four discrete levels ranging from black to white, for the case of black-and-white television.

If illumination is uniformly lower, amplitudes are correspondingly smaller and signals corresponding to line 1*a* may be symbolized by the curve 1*c*, produced by reducing the amplitudes of curve 1*b* by subtracting a constant value therefrom. The resulting image is uniformly darker.

If illumination is not uniform, such as when the scene is selectively illuminated by vehicle headlights, it is necessary to subtract values varying as a function of the desired brightness distribution from the curve 1*b*. Such a distribution is known for a predetermined light source and may be embodied by the curve 1*e*, which, for instance, corresponds to the illumination of a white wall by a headlight, again for a given scan line. The waveforms of 1*d* correspond to the light distribution pattern of 1*f*. Therefore, for obtaining the signal 1*d* corresponding to the illumination of 1*a* by that headlight, a voltage waveform corresponding to the curve 1*e* must be subtracted from signal 1*b*. In the curve 1*e*, outer areas *tz* and *vw* correspond to non-illuminated areas, the subtracted values being maximum to produce a signal corresponding to the black level irrespective of the amplitudes of the curve 1b in those outer areas. Conversely, area *xy* corresponds to a normally illuminated area. Values to be subtracted are zero therein, so as to leave amplitudes of the curve 1*b* unmodified in that area. Transition areas *zx* and *yv* correspond to half-illuminated areas wherein values to be subtracted vary as a function of positions of points which are associated thereto.

In the same manner, for points of any line, the distribution of the subtracted corrections correspond to a predetermined curve, for points located on the same vertical.

Thus, each displayed point has a luminous intensity equal to the sum of a signal corresponding to the luminous intensity received by the camera corresponding to that point and the two correction signals corresponding to coordinates of that point in the screen plane with respect to the simulated luminous source beam.

Figure 2:
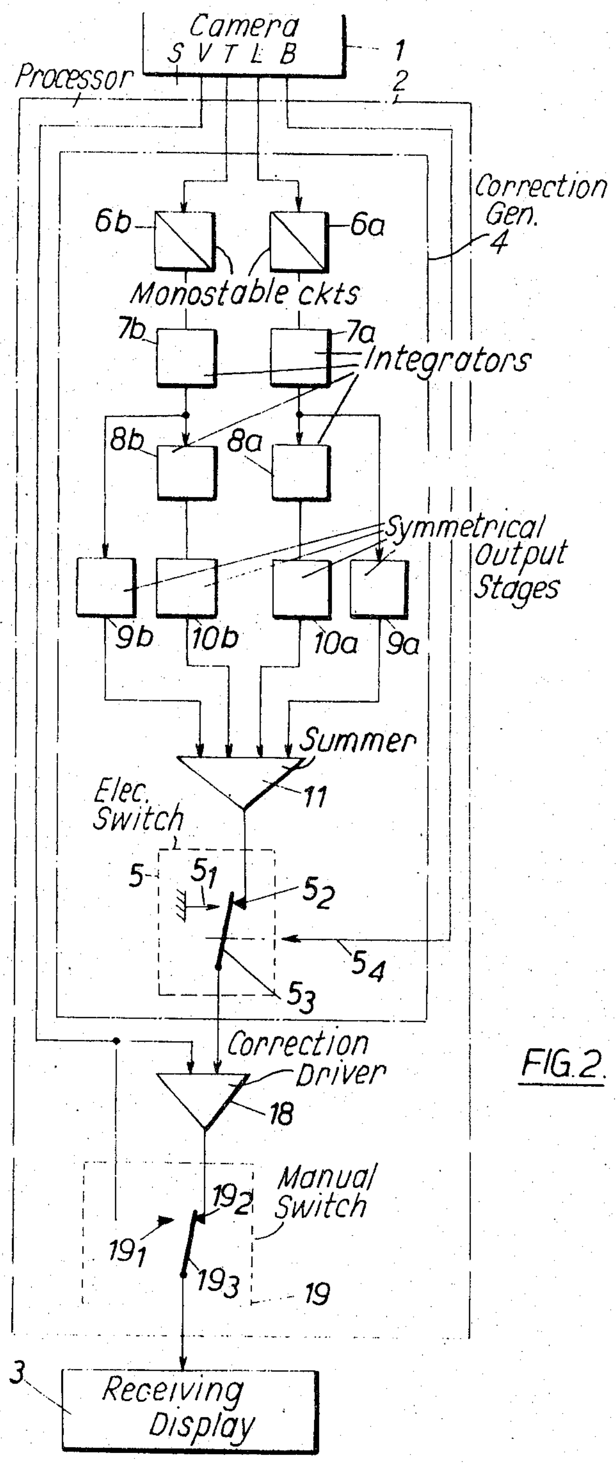
FIG. 2 is a block diagram of a first embodiment of a device according to this invention, applied to the case of a single simulated light source.

The device, shown in FIG. 2, embodies the principles of simulation of a single luminous vehicle source.

The device 2, according to this invention, is a camera signal processor inserted between the camera-control-channel assembly 1 and a receiver 3.

Assembly 1 is the camera and comprises a line pulse output L, a frame pulse output T, a mixed line and frame blanking signal output B, a mixed line and frame synchronization signal output S and a video signal output V.

The device 2 has a correction generator 4, correction mixer means *7a* and *7b* and switching means *6a* and *6b*, these means comprising two correction circuit channels having identical structure. Each correction circuit produces a correction curve for one of the two plane coordinates. For that purpose, one correction circuit (*6a* and *7a*) has its input connected from output L of assembly 1 and the other (*6b* and *7b*) from output T.

In the line correction circuit, connected from output L, the circuit *6a* comprises a conventional monostable circuit having its input connected from output L. Time constant T*a* of that circuit *6a* is equal to the duration of a line.

The frame correction circuit, connected from output T, comprises conventional monostable circuit *6b* having its input connected from output T. Time constant T*b* of that circuit *6b* is equal to the duration of a frame.

Thus, each of the monostable circuits *6a* and *6b* delivers a signal having a duration equal to its time constant, when it has received an input pulse.

Monostable circuits *6a* and *6b* respectively, deliver signals to integrators *7a* and *7b*, which responsively deliver sawtooth-shaped signals.

The output of integrator *7a* is connected to the input of integrator *8a* and also to a conventional symmetric output stage *9a*.

Output stage *9a* makes it possible to adjust the characteristics of the sawtooth provided from integrator *7a*, if necessary.

Responsive to the sawtooth input signal, integrator *8a* delivers a dome-shaped output signal. Likewise, integrator *8a* is followed by a symmetric output stage *10a*, which makes it possible to adjust characteristics of the delivered dome-shaped output signal.

The frame correction circuit also comprises two integrators *7b* and *8b*, and symmetric output stages *9b* and *10b* thereof.

The output signals from stages *9a*, *9b*, *10a* and *10b* are added in a summer 11 which delivers a single correction signal. Summer 11 may, for example, be of operational amplifier type. Output thereof is connected to an input $5_2$ of a two-input switch 5. Electronic-type switch 5 permits suppression of the correction signals during line and frame blanking times, since for those times no luminous data appears on the screen of receiver 3.

During either line or frame blanking signals (on lead $5_4$), switch 5 inhibits transfer of the correction signals from summer 11 and applies to the input of correction driver 18, a ground potential instead of the correction signal.

Correction driver 18 permits signals from switch 5 to be summed with video signals received from 1 (output V). Driver 18 may also consist of an operational amplifier.

The output of driver 18 is connected to switch 19 constituted by a manual two-position switch. The first position of switch 19 corresponds to a normal transfer of video signals from the camera, that is to the transmission of a normally illuminated image, the first input $19_1$ of switch 19 being then connected from output V of assembly 1 to video signal input of receiver display 3, via output $19_3$. The second position of switch 19 makes it possible to obtain the corrected image corresponding to a reproduction of night vehicle headlight illumination conditions, the second input $19_2$ of switch 19 being connected from the output of correction driver 18 to the video signal input of 3, via output $19_3$.

Referring now to FIG. 3, an alternative is depicted showing a device, similar to FIG. 2 but supplemented with an arrangement 12 which permits reconstitution of video signals altered by the correction.

Restoration circuit 12 is connected from between the output of driver 18 to switch 19. Thus, it receives modified video signals from 4. The input of 12 is connected to a calibration (clamp) circuit 13 which clamps video signals at a reference level. Circuit 13 is of a well known type. It is controlled by signals from output L of assembly 1 and conventionally clamps the level of signals from driver 18 during each scan line.

The output signals from circuit 13 are then applied to an input of a blanking mixer 14 designed for reconstituting line and frame blanking signals from output B of camera 1. Output signals from circuit 14 are applied to an input of synchronization mixer 15 which is also supplied the mixed line and frame synchronization output S from 1. Circuit 15 is also a conventional type.

Corrected reconstituted signal is applied from the output of 15 to input $19_2$ of manual switch 19, via output amplifier 16, and then is applied to the receiving display.

As previously, according to its position, switch 19 enables signals directly delivered by the camera to pass for reproducing the normally illuminated TY imagery, or corrected reconstituted signals to pass for simulating the reproduction of the same imagery as illuminated by vehicle headlight.

Obviously, for reproducing imagery as viewed from a vehicle and as illuminated by several headlights, it is possible to add as many line correction circuits and as many frame correction circuits as there are illuminating headlights. Output signals from those circuits are summed in one or several summers 11. That summer is likewise connected to correction driver 18, via a switch 5, and driver 18 are connected to 3, via an arrangement 12 and switching means 19.

Figure 4:
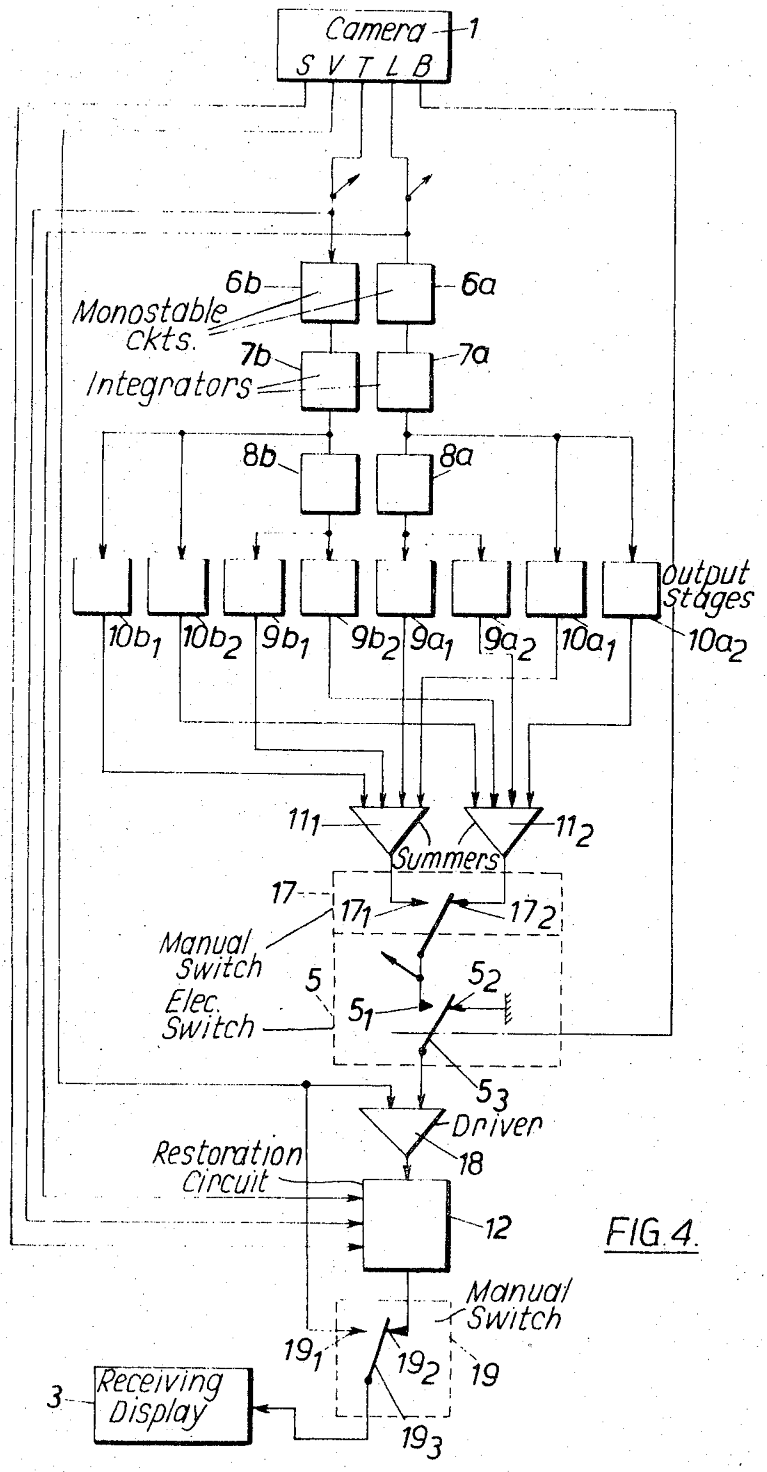
FIG. 4 is a block diagram of a further alternative embodiment applied to the case of an illumination arrangement capable of providing two distinct alternatively usable beams.

FIG. 4 shows another alternative embodiment wherein the same illumination apparatus can simulate two non-simultaneous distinct beams, for example, full and low beam headlights.

In this case, correction means still comprises the two monostable circuits 6$a$ and 6$b$, and the two integrators 7$a$ and 7$b$. However, the output stages and integrators connected from outputs of integrators 7$a$ and 7$b$, are divided into two sets. Output stages $9a_1$, $9b_1$, $10a_1$ and $10b_1$ are connected to summer $11_1$ which is provided with the different correction components regarding the first source condition, that is, for instance, to the low beam.

Correction signals are processed and adjusted in the same manner as in the previously described embodiments.

Likewise, output stages $9a_2$, $9b_2$, $10a_2$ and $10b_2$ are connected to summer $11_2$ which is provided with the different correction components corresponding to the second source condition (i.e., the full beam).

An additional manual (beam selector) switch 17 has one input connected from the output of summer $11_1$, and the other input connected from the output of summer $11_2$. The output of switch 17 is conventionally connected to switch 5 which makes it possible to suppress the correction signal during line and frame blanking times. The elements of the remainder of the device of FIG. 4 are identical to those described in relation with previous embodiments and includes driver 18, signal restoration circuit 12 and manual switch 19.

Depending on the position of switches 17 and 19, it is then possible to produce simulation of normal daylight and of low beam illumination, or full beam illumination.

In accordance with the described principles, such an arrangement may be otherwise applied in an obvious manner. Likewise, various circuits may be added for simulating various failures.

Such circuits will not be described since they are simple and would be obvious to those skilled in the art, once the principles of the present invention are understood.

While the principles of the present invention have hereabove been described in relation with specific embodiments, it will be clearly understood that the said description has only been made by way of example and does not limit the scope of this invention.

What is claimed is:

1. In a vehicle operator training device which includes a closed circuit television arrangement having at least one display and a camera mounted to view a scene simulating that which would be presented to said vehicle operator under natural conditions, the combination comprising:

means within said camera for providing at least video and scan timing signal outputs;

correction generator means responsive to said timing signals to generate a composite correction function representative of a predetermined illumination gradient in at least one scan coordinate;

and correction driver means responsive to said camera video output and said composite control function for modulating said video in amplitude as a variable function of said illumination gradient through at least a portion of the scan of said camera in said scan coordinate.

2. Apparatus according to claim 1 in which said timing signals include first and second signals representative of the scan periods of said camera in line and frame coordinates, respectively, and said correction generator means are responsive thereto to effect said video modulation in both said line and frame coordinates.

3. Apparatus according to claim 2 in which said camera also provides a blanking signal and including an electronic switch arranged to switch in synchronism with said blanking signal, said electronic switch further being connected to interrupt said correction function during a predetermined condition of said blanking signal.

4. Apparatus according to claim 3 in which said blanking signal comprises mixed line and frame blanking signals delivered by said camera, and said blanking signal operates said electronic switch such that said predetermined condition during which said correction function is interrupted corresponds to times during which said display and camera scans are in other than useful scan periods.

5. Apparatus according to claim 4 in which the times when said display and camera scans are in other than useful scan periods comprises the flyback periods.

6. Apparatus according to claim 4 in which said correction generator means comprises first and second signal processing channels, said first channel being responsive to said frame timing signal and said second channel being responsive to said line timing signal to produce first and second separate correction functions corresponding respectively to said frame and line durations, and means are included for summing said first and second separate correction functions to produce said composite correction function.

* * * * *